US011157151B1

(12) United States Patent
Singh

(10) Patent No.: US 11,157,151 B1
(45) Date of Patent: Oct. 26, 2021

(54) DIRECT LINKING WITHIN APPLICATIONS

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/940,482

(22) Filed: Jul. 28, 2020

(51) Int. Cl.
*G06F 3/0484* (2013.01)
*H04L 12/24* (2006.01)

(52) U.S. Cl.
CPC ........... *G06F 3/0484* (2013.01); *H04L 41/22* (2013.01)

(58) Field of Classification Search
CPC ......... G06F 3/0484; G06F 3/048; H04L 41/22
See application file for complete search history.

(56) References Cited

U.S. PATENT DOCUMENTS

| 9,183,004 | B2 | 11/2015 | Manjunath et al. | |
|---|---|---|---|---|
| 2009/0178004 | A1* | 7/2009 | Stoval, III | G16H 10/60 715/812 |
| 2011/0246881 | A1 | 10/2011 | Kushman et al. | |
| 2013/0222296 | A1* | 8/2013 | Paek | G06F 3/04883 345/173 |
| 2016/0342314 | A1* | 11/2016 | Dickerson | G06F 3/04842 |
| 2017/0161085 | A1 | 6/2017 | Tobin | |
| 2017/0192941 | A1* | 7/2017 | Glover | H04L 67/2804 |
| 2019/0196674 | A1* | 6/2019 | Baig | G06F 9/445 |
| 2020/0042295 | A1* | 2/2020 | Straub | G06F 8/20 |
| 2020/0057541 | A1* | 2/2020 | Wantland | G06F 3/0484 |
| 2020/0226615 | A1* | 7/2020 | Gaur | G06F 3/0482 |

OTHER PUBLICATIONS

International Search Report and Written Opinion dated Aug. 9, 2021 for International application No. PCT/US2021/029549; 14 Pages.

* cited by examiner

*Primary Examiner* — Jeanette J Parker
(74) *Attorney, Agent, or Firm* — Daly, Crowley, Mofford & Durkee, LLP

(57) ABSTRACT

In some embodiments, a method includes: receiving, by a computing device, information indicative of user interface (UI) elements of an application and inputs received by the UI elements; identifying, by the computing device, a feature of the application based on the received information; generating, by the computing device, a direct link to the feature by determining, from the received information, one or more of the UI elements that received inputs to navigate to the feature; and providing, by the computing device, the direct link to one or more users of the application, wherein in response to an input received on the direct link, the direct link interacts with the one or more UI elements to navigate to the application feature.

20 Claims, 10 Drawing Sheets

DIRECT LINKING WITHIN APPLICATIONS

BACKGROUND

Computer applications (or "apps") may include features that require multiple user inputs to access. Such features can include pages, sections, forms, video, and other functionality or content provided by the app. For example, web-based apps, including many Software as a Service (SaaS) apps, may have features that are accessible only after navigating to a uniform resource locator (URL) and clicking, tapping, scrolling, or otherwise interacting with multiple user interface (UI) elements. Some web apps are designed as so-called "single-page applications," meaning they interact with the web browser by dynamically replacing some, or all, web page content without changing the URL.

SUMMARY

Existing systems that provide access to web-based apps do not provide a general mechanism for directly linking to arbitrary features within those apps. For example, with single-page apps, web browser bookmarks cannot be used to link to features for which the URL does not change. Likewise, some apps use dynamic URLs that can vary for different users or for the same user across different sessions. For example, the URL corresponding to a particular feature may include query parameters, session parameters, or other dynamic data. It is appreciated herein that requiring users to manually navigate to app features, particularly frequently used features, is inefficient and can result in significant loss of productivity.

Accordingly, disclosed herein are embodiments of systems and methods for providing direct linking to features within apps. Disclosed embodiments can, in general, be used to link to arbitrary features with existing apps and within apps not yet in existence, regardless of the structure of the app or the number of steps required to access the feature. Disclosed embodiments can automatically monitor URL changes and user inputs to collect page navigation and user interaction data, analyze the collected data to determine causal relationships between particular user interface (UI) elements and URLs, and generate direct links based on such analysis. Disclosed embodiments can generate direct links that navigate to features in a minimum number of steps based on an analysis of crowdsourced data. Disclosed embodiments generate direct links that are operable for different users and/or sessions. Disclosed embodiments generate direct links as scripts that can be used to "replay" manual user interactions and/or page navigations, provide a single-input mechanism to navigate to app features. Disclosed embodiments can identify commonly accessed features and automatically generate direct links to those features. Disclosed embodiments can be used in conjunction with speech or assistive devices and software to provide direct linking within apps to users who are unable to, or prefer not to, interact with such apps using conventional means.

According to one aspect of the present disclosure, a method can include: receiving, by a computing device, information indicative of user interface (UI) elements of an application and inputs received by the UI elements; identifying, by the computing device, a feature of the application based on the received information; generating, by the computing device, a direct link to the feature by determining, from the received information, one or more of the UI elements that received inputs to navigate to the feature; and providing, by the computing device, the direct link to one or more users of the application, wherein in response to an input received on the direct link, the direct link interacts with the one or more UI elements to navigate to the application feature.

According to another aspect of the present disclosure, a device can include a processor and a non-volatile memory storing computer program code. The computer program code, when executed on the processor, can cause the processor to execute a process operable to: receive information indicative of user interface (UI) elements of an application and inputs received by the UI elements; identify a feature of the application based on the received information; generate a direct link to the feature by determining, from the received information, one or more of the UI elements that received inputs to navigate to the feature; and provide the direct link to one or more users of the application, wherein in response to an input received on the direct link, the direct link interacts with the one or more UI elements to navigate to the application feature.

According to one aspect of the present disclosure, a non-transitory computer readable medium can store program instructions that are executable to: receive, by a computing device, information indicative of user interface (UI) elements of an application and inputs received by the UI elements; identify, by the computing device, a feature of the application based on the received information; generate, by the computing device, a direct link to the feature by determining, from the received information, one or more of the UI elements that received inputs to navigate to the feature; and provide, by the computing device, the direct link to one or more users of the application, wherein in response to an input received on the direct link, the direct link interacts with the one or more UI elements to navigate to the application feature.

In some embodiments, the generation of the direct link can include generating a script having a sequence of steps for interacting with the one or more UI elements, wherein in response to the input received on the direct link, the sequence of steps are executed to navigate to the application feature. In some embodiments, the sequence of steps can include a first step of navigating to a static URL and a last step of triggering an input on one of the UI elements. In some embodiments, the method can include analyzing the received information to determine that a first one of the UI elements can be accessed using a static URL and a second one of the UI elements cannot be accessed using a static URL.

In some embodiments, the received information may be indicative of inputs used to access the UI elements by a plurality of users during a plurality of user sessions and the method can include analyzing the received information to determine that a first one of the UI elements can be accessed using a URL that is the same for the same user across different user sessions and different for different users. In some embodiments, the received information may indicate that ones of the UI elements can be accessed via an input on others of the UI elements. In some embodiments, the identification of the feature can include determining a frequency at which one or more of the UI elements are accessed. In some embodiments, the identification of the feature can include receiving an input on one or more UI elements associated with the feature.

In some embodiments, providing of the direct link to the one or more users of the application can include sending the direct link to client devices configured to display the direct link within a directory of direct links accessible to the one or more users. In some embodiments, providing of the direct link to the one or more users of the application can include publishing the direct link to a search engine accessible by client devices configured to run the application. In some embodiments, in response to the input received on the direct link, the direct link may interact with the one or more UI elements to navigate to the application feature without display of other portions of the application that do not include the feature.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
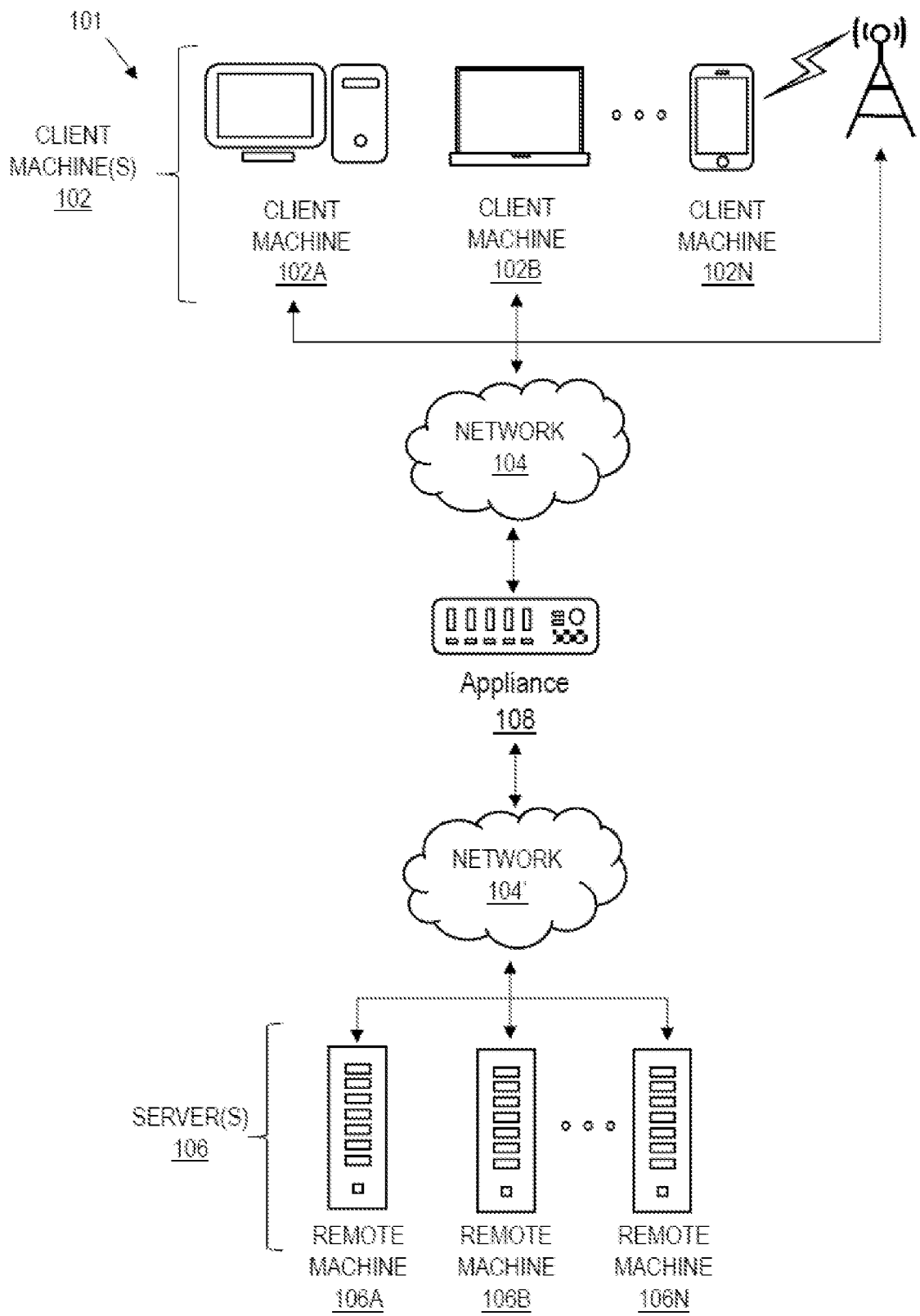
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
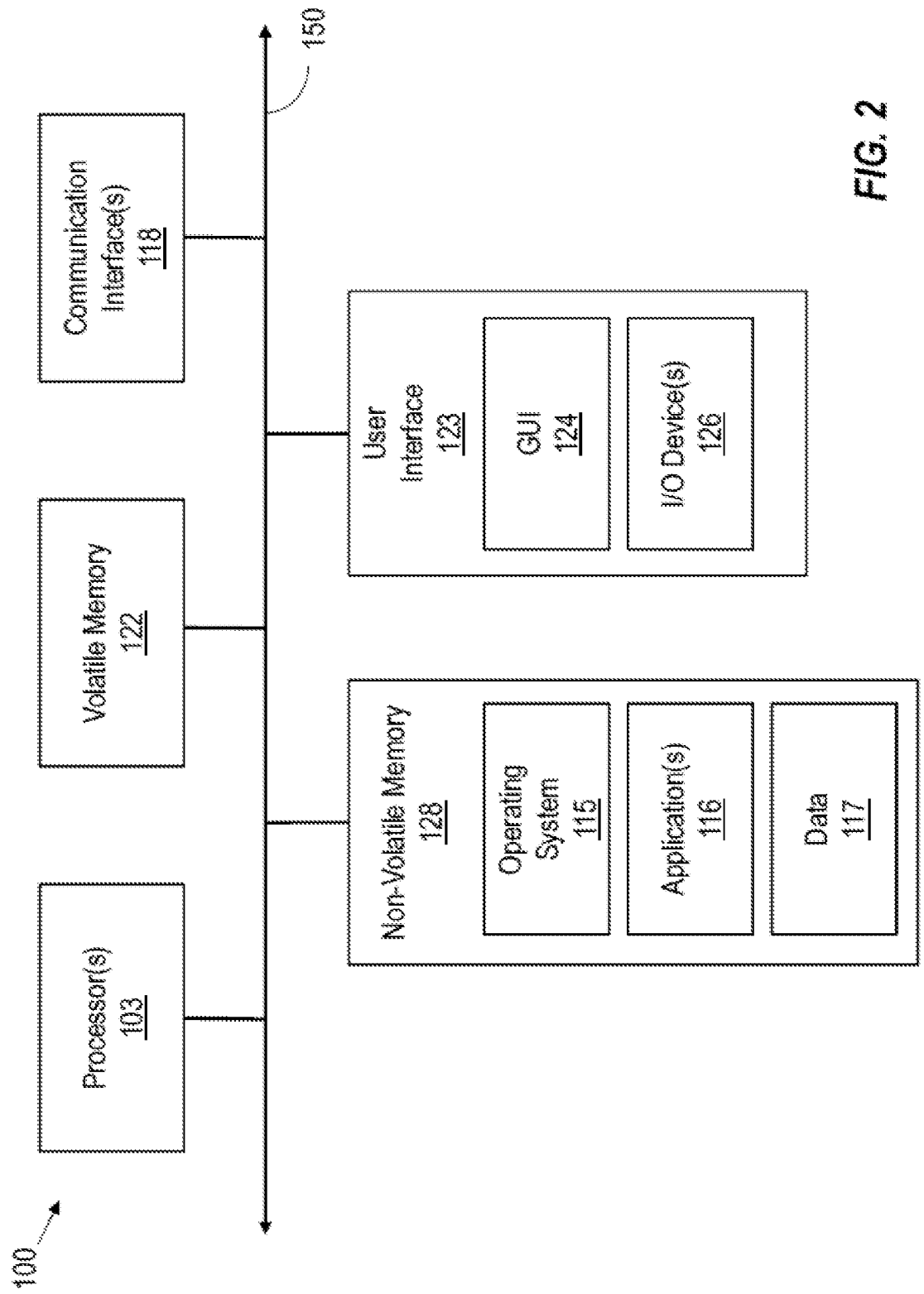
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
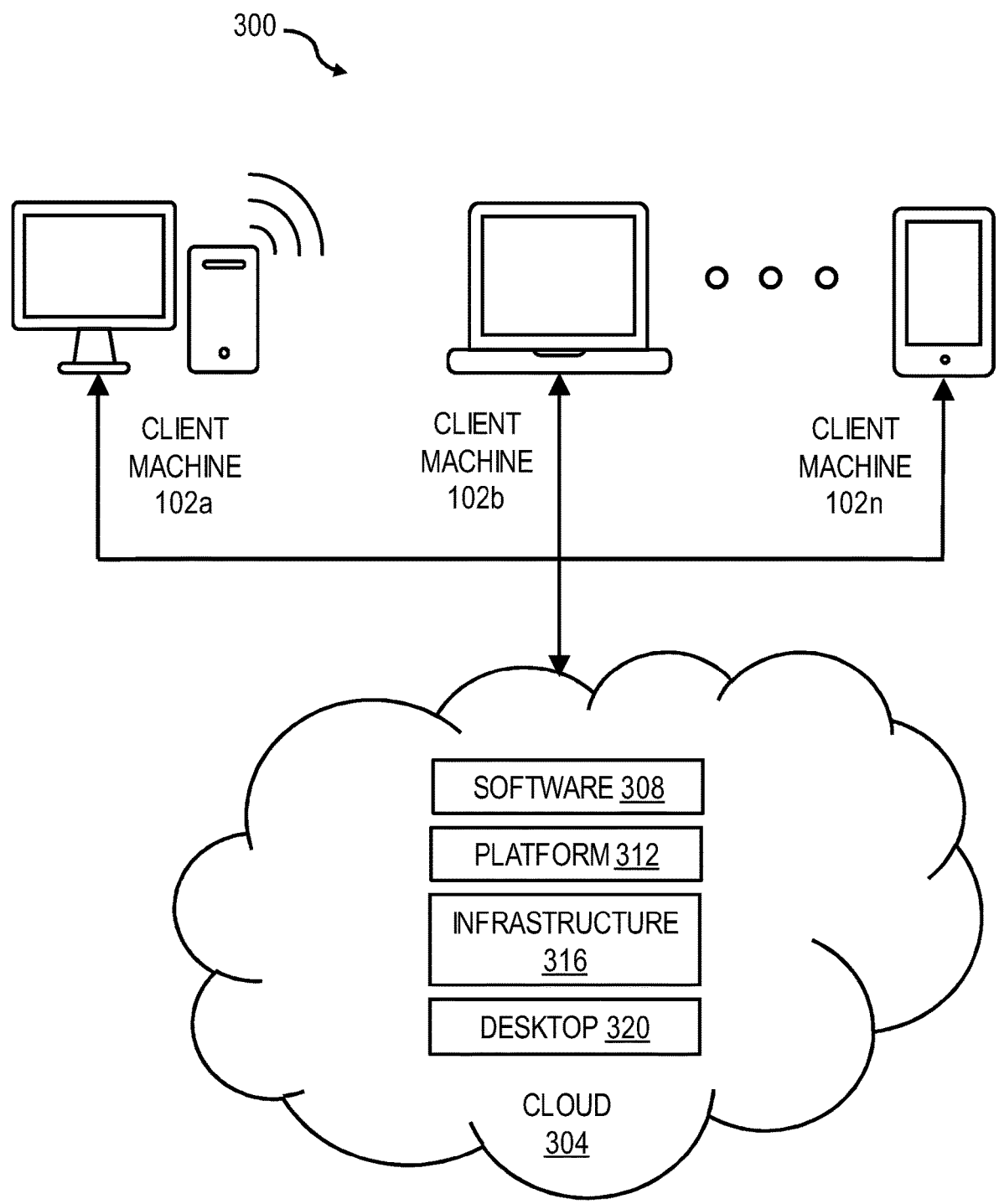
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
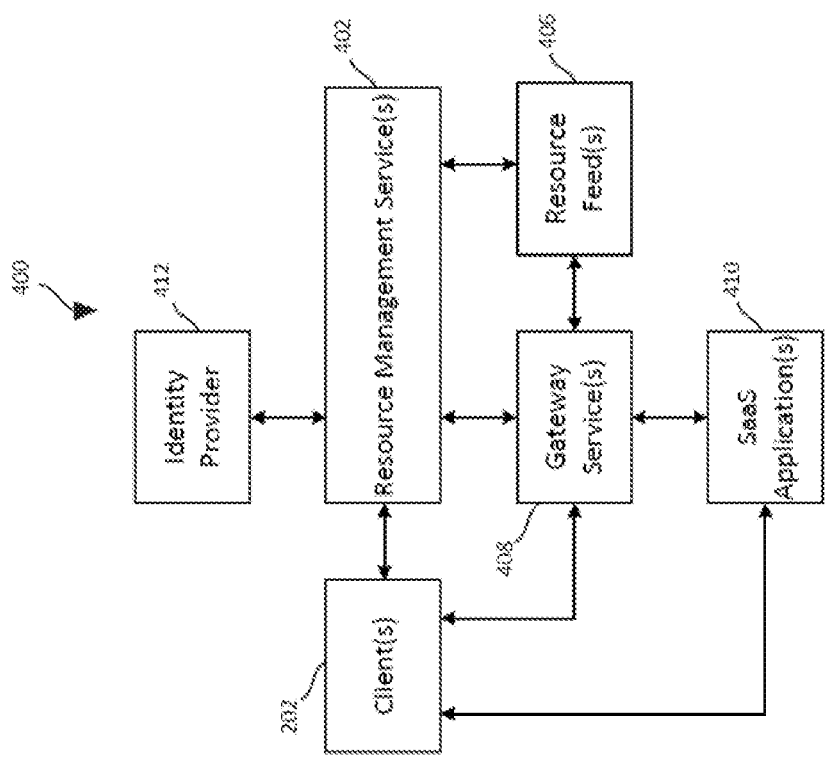
FIG. 4A is a block diagram of an example system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
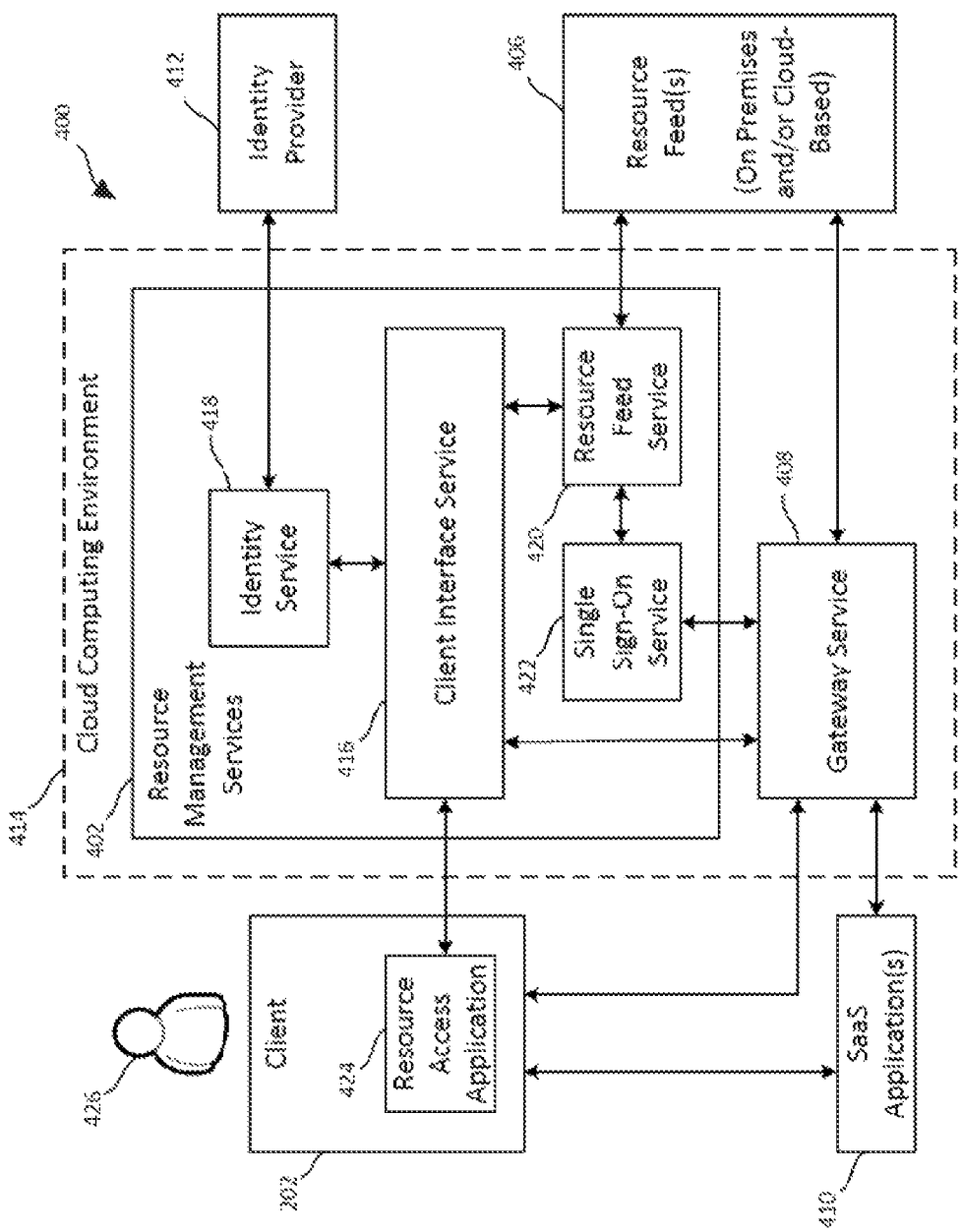
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
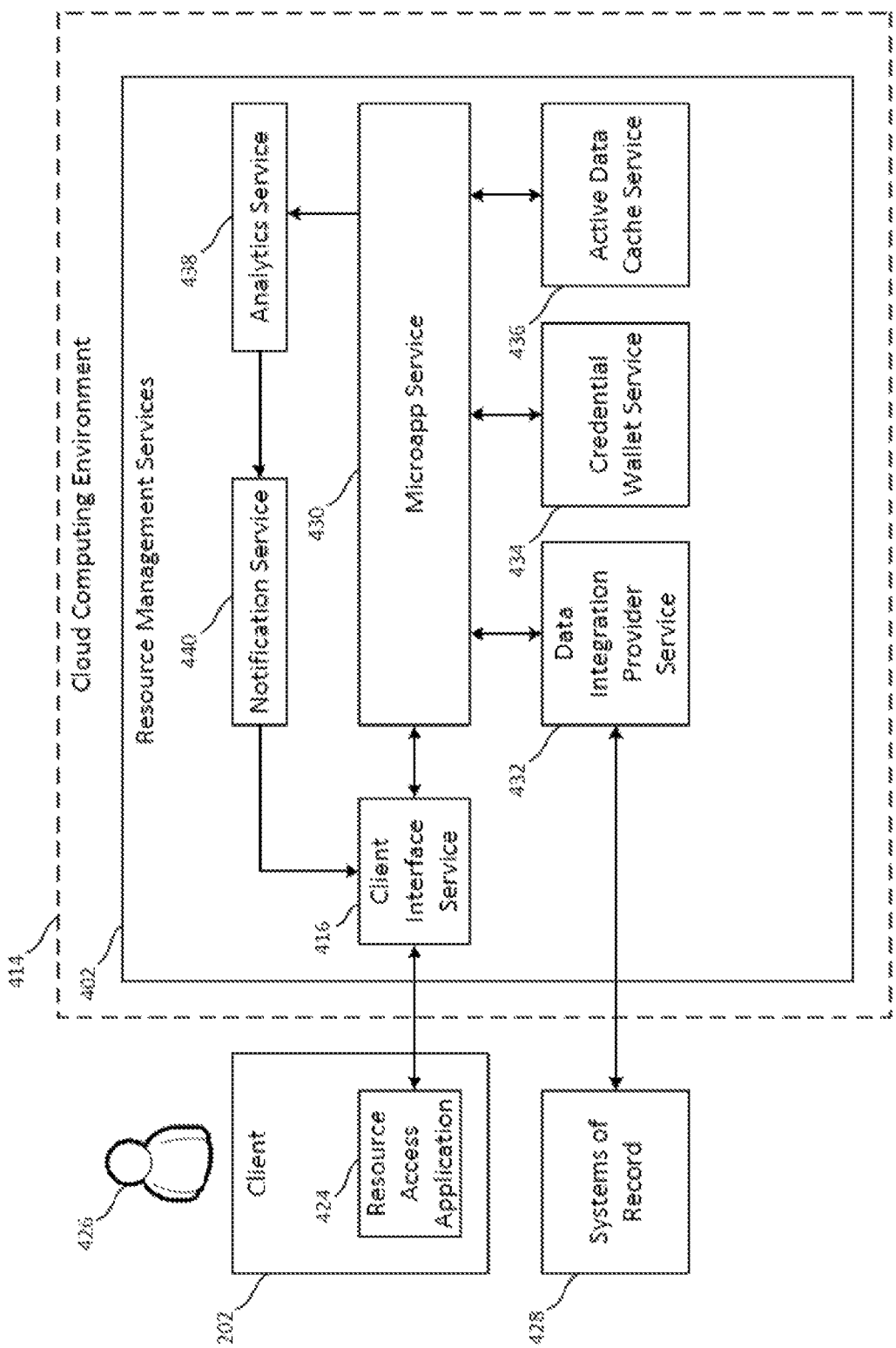
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information being sought.

Figure 5:
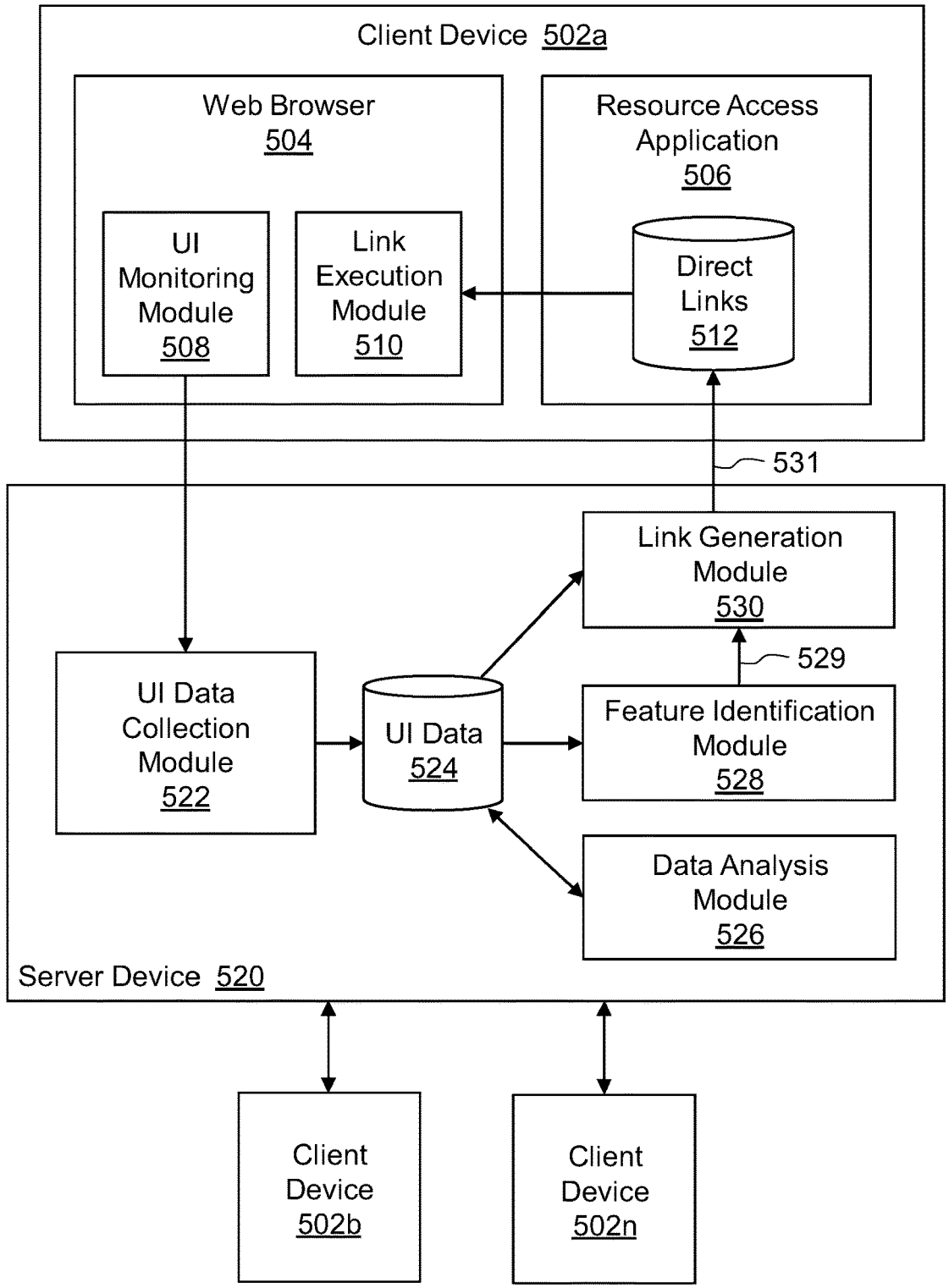
FIG. 5 is a block diagram of a system that provides direct linking to app features, according to some embodiments.

FIG. 5 shows an illustrative system 500 that provides direct linking to app features, according to some embodiments. As used herein, the term "app feature" refers to any content or functionality provided by an app, including but not limited to pages, sections, forms, videos, and other content or functionality provided within the app. The illustrative system 500 includes one or more client devices 502a, 502b, . . . , 502n (502 generally) connected to a server device 520. The client devices 502 may be connected to server device 520 by one or more wireless or wireline computer networks.

In some embodiments, system 500 may form part a network environment, such as network environment 101 of FIG. 1. For example, client devices 502 of FIG. 5 may correspond to client machines 102 of FIG. 1, and server device 520 of FIG. 5 may correspond to one or more servers 106 of FIG. 1.

In some embodiments, system 500 may form part a cloud computing environment. For example, client devices 502 of FIG. 5 may correspond to client machines 102 of FIG. 3, and server device 520 of FIG. 5 may correspond to a virtual or physical server providing a cloud-based service, such as SaaS 308 of FIG. 3. As another example, client devices 502 of FIG. 5 may correspond to clients 202 of FIGS. 4A-4C, and server device 520 of FIG. 5 may correspond to a resource management service 402 or, more particularly, to an analytics service 438 as shown and described in the context of FIGS. 4A-4C.

Client devices 502 may include smartphones, tablets, laptops, desktops, workstations, or other types of client devices configured to install and run applications, or "apps." For example, as shown in FIG. 5, a representative client device 502a can have installed a web browser 504 and a resource access app 506. The resource access app 506 may be the same as or similar to resource access application 424 of FIGS. 4B and 4C. In some embodiments, web browser 504 may be part of resource access app 506. For example, web browser 504 can be provided as an embedded browser using the CHROMIUM EMBEDDED FRAMEWORK (CEF). Representative client device 502a can include other hardware and software components such as those described above in the context computing device 100 of FIG. 2. The other client devices 502b . . . 502n may have the same or similar hardware and software components as representative client device 502a.

Illustrative server device 520 can include a UI data collection module (or "collection module") 522, a storage device configured to store UI data 524, a data analysis module 526, a feature identification module 528, and a link generation module 530. As used herein, the term "module" refers to a collection of hardware and/or software configured to perform and execute the processes, steps, or other functionality described in conjunction therewith. Server device 520 can provide one or more APIs via which the client devices 502 can access features of the server device described herein. Server device 520 can include other hardware and software resources such as those described above in the context computing device 100 of FIG. 2.

Referring again to representative client device 502a, web browser 504 can include a UI monitoring module (or "monitoring module") 508 and a link execution module 510. In some embodiments, modules 508 and 510 can be provided as one or more browser extensions, browser plugins, or Browser Helper Objects (BHOs).

Monitoring module 508 can monitor activity within the web browser 504 as the user visits and interacts with various web apps and websites. For example, module 508 can monitor the current page URL and detect when the current page URL changes. As another example, module 508 can monitor various elements of the Document Object Model (DOM) and detect when a user clicks, taps, or otherwise interacts with UI elements. Such interactions are generally referred to herein as "user inputs" or simply "inputs."

The DOM is an interface that treats an XML or HTML document (e.g., a web page) as a tree structure wherein individual nodes are objects representing a part of the document. Such objects can have properties, methods, and events. For a given web page, the DOM may include nodes corresponding to the browser window, the HTML document, sections of the document, tables, links, forms, text inputs, buttons, etc.

In some embodiments, monitoring module 508 can use an API provided by web browser 504 to inspect the DOM, query for DOM elements, inspect and manipulate DOM elements, and listen for events on DOM elements. For example, monitoring module 508 can listen for browser navigation events (e.g., webNavigation events) to detect when the current page URL changes. As another example, monitoring module 508 can attach event listeners (or "handlers") to various UI elements such as links, forms, buttons, etc. to detect user inputs thereon (e.g., using addEventListener to listen for click events). In some embodiments monitoring module 508 can use a JavaScript API to interact with the DOM. The event listeners can include click and/or touch event listeners.

Based on the monitoring, module 508 can collect information identifying UI elements of a web app and the user inputs that were used to access those UI elements during one or more user sessions. For brevity, such information may be referred to herein as "UI data." A detailed description of UI data that can be collected by monitoring module 508 is described below. Monitoring module 508 can send collected UI data to the server device 520 via an API provided by the server device 520. UI data can also include information that identifies the app, user, session, and other context of the data collection.

TABLE 1

| SN | App Id | UserId | Session Id | PageURL | Page Title | ElementId |
|---|---|---|---|---|---|---|
| 1 | HR | 1 | A | https://h.r | Main | Benefits |
| 2 | HR | 1 | A | https://h.r | Main | TimeOff |
| 3 | HR | 1 | A | https://h.r | Main | Performance |

| SN | Element Attributes | Accessor Type | AccessorElement | TargetURL | AccessorURLType | ScrollPosition |
|---|---|---|---|---|---|---|
| 1 | type=link, . . . | URL | None | TBD | TBD | (0, 0) |
| 2 | type=link, . . . | URL | None | TBD | TBD | (0, 100) |
| 3 | type=link, . . . | URL | None | TBD | TBD | (0, 200) |

TABLE 1 shows a simplified example of UI data that can be collected by client-side monitoring module 508 when browsing to the main page of an illustrative human resources app ("HR"). In this example, a subject user visits the main page of the app (titled "Main") by going to a base URL for the app ("https://h.r"). As used herein, "subject user" refers to the user of the client device 502 when UI data is being collected. The main page of the app includes three UI elements: "Benefits," "TimeOff," and "Performance." These elements can be identified by inspecting the DOM, for example. In practice, the disclosed subject matter can be used to provide direct links within apps that have an arbitrary number of UI elements (e.g., tens, hundreds, or thousands of elements) per page.

As shown in TABLE 1, monitoring module 508 can collect information for individual UI elements, which are identified by unique serial numbers (SNs) in the table. To fit on this paper, each row (or "entry" or "record") in TABLE 1 (and in subsequent tables in this disclosure) are shown as being split across two tables that can be joined by the respective SN columns. In the example of TABLE 1, the information collected for individual UI elements can include AppId, UserId, SessionId, PageURL, PageTitle, ElementId, ElementAttributes, AccessorType, AccessorElement, TargetURL, AccessorURLType, and ScrollPosition.

AppId can uniquely identify the app within system 500. For example, AppId can include a published name of the web app (e.g., "HR") or a unique ID assigned to the app within system 500. UserId can include a value (e.g., "1") that uniquely identifies the subject user within system 500, either alone or in combination with AppId (i.e., UserIds can be reused across different apps in some embodiments). SessionId can include a value that uniquely identifies the user's session within the system 500, either alone or in combination with UserId and/or AppId (i.e., SessionIds can be reused between users and/or apps). PageURL and PageTitle can include the URL and title, respectively, of the page on which the present UI element was identified.

ElementId can identify UI elements on the page (e.g., the page as identified by PageURL and/or PageTitle). For example, ElementId can include one or more HTML attributes defined for the UI element, such as an "id," "name," or "label" attribute. As another example, ElementId can include a string representation of an HTML element corresponding to the UI element or a child HTML element in the DOM. As another example, ElementId can correspond to a path (e.g., an XPath) or query (e.g., jQuery selector) that identifies the element on the page.

ElementAttributes can include one or more attributes of the identified UI element, separate or in addition to any such attributes within ElementId. In some embodiments, ElementAttributes can indicate the type of element, such as "link," "section," "form," "video," etc. This information can be used to identify app features, as discussed further below. The element type can be derived from the type and/or attributes of the DOM node corresponding to the present UI element, or to those of ancestor or descendant nodes.

AccessorType can indicate how the identified UI element was accessed. In some embodiments, the possible values of AccessorType include "URL" and "DifferentPage." "URL" indicates that the present UI Element was directly accessed by navigating to a URL. "DifferentPage" indicates that the identified UI element was accessed in response to a user input that did not change the current page URL. For example, in single-page web apps, the identified UI element may become accessible in response to a user input that results in the current page being dynamically modified.

AccessorElement can indicate another UI element that received an input, causing the identified UI element to become accessible to the user. In some embodiments, AccessorElement can include the serial number (SN) of the other UI element as defined in, for example, TABLE 1. In other embodiments, AccessorElement can include attributes of the other UI Element along with its the page URL, title, or other identifying information for the UI element within the app. If the identified UI element was accessed from the base URL, then AccessorElement can be set to "None," left blank, etc. Because TABLE 1 only includes UI elements accessed directly by navigating to the base URL of the illustrative app, AccessorElement is set to "None" for each of these elements.

TargetURL can identify the URL that is browsed to when a user input occurs on the identified UI Element. This value can be used to improve the efficiency of generated direct links, as explained below. Monitoring module 508 can determine TargetURL by listening for a user input event on the UI element and determining the new page URL, if any, resulting from the input. In some embodiments, where web browser 504 is a CHROMIUM-based browser, module 508 can detect a URL change using the "webNavigation" event. If the user input does not result in a new page URL, then TargetURL may be set to "None," left blank, etc. For certain types of UI elements, the TargetURL can be determined by statically analyzing the HTML document to parse the URL. For example, for hyperlinks, the URL can be parsed from the "href" attribute of the corresponding anchor tag (e.g., <a href=' . . . '>). In the example of TABLE 1, the TargetURLs for the initial three UI elements are yet to be determined ("TBD"). As discussed below, this and other columns of the table can be updated over time as additional UI data is collected.

The TargetURL for a UI element can be the same for all users or can vary for different users or across different sessions for the same user. These distinctions can be used to improve the efficiency of generated direct links, as explained below. Accordingly, AccessorURLType can include a value indicating if the TargetURL for the identified UI element is the same for all users of the app ("Static"), is the same for the subject user across different sessions ("UserStatic"), is different for different users and/or sessions ("Dynamic"), or if the variability of the TargetURL has yet to be determined ("TBD"). TABLE 1 shows UI data collected for a single user session and, thus, TargetURL is indeterminate ("TBD"). As discussed below, TargetURL and other columns of the table can be updated over time as additional UI data is collected.

ScrollPosition can identify a position of the identified UI element relative to the current page as displayed by the browser. For example, ScrollPosition can identify the position of the browser's horizontal and vertical scroll bars when the UI element is within the viewport (i.e., visible to the user). The ScrollPosition can be determined using an API provided by the browser. As discussed below, ScrollPosition can be used to generate direct links that automatically scroll the page so that an app feature comes into view.

Monitoring module 508 can continually collect UI data during one or more user sessions. This is illustrated by TABLE 1A, which may correspond to an update of TABLE 1 for the same user session ("A").

TABLE 1A

| SN | App Id | User Id | Session Id | PageURL | PageTitle | ElementId |
|---|---|---|---|---|---|---|
| 1 | HR | 1 | A | https://h.r | Main | Benefits |
| 2 | HR | 1 | A | https://h.r | Main | TimeOff |
| 3 | HR | 1 | A | https://h.r | Main | Performance |
| 4 | HR | 1 | A | https://h.r/benefits | Benefits | Insurance |
| 5 | HR | 1 | A | https://h.r/timeoff-123 | Time Off | View PTO |
| 6 | HR | 1 | A | https://h.r/perform-123 | Performance | Start Review |

TABLE 1A-continued

| SN | Element Attributes | Accessor Type | AccessorElement | TargetURL | AccessorURLType | ScrollPosition |
|----|---|---|---|---|---|---|
| 1 | type=link, . . . | URL | None | https://h.r/benefits | TBD | (0, 0) |
| 2 | type=link, . . . | URL | None | https://h.r/timeoff-123 | TBD | (0, 100) |
| 3 | type=link, . . . | URL | None | https://h.r/perform-123 | TBD | (0, 200) |
| 4 | type=form, . . . | URL | SN 1 | TBD | TBD | (0, 0) |
| 5 | type=section, . . . | URL | SN 2 | TBD | TBD | (0, 0) |
| 6 | type=form, . . . | URL | SN 3 | TBD | TBD | (0, 0) |

Referring to the example of TABLE 1A, in response to an input on the "Benefits" UI element, the current page URL changes to "https://h.r/benefits" and a new UI element "Insurance" is identified. As a result, the TargetURL for the "Benefits" element (SN "1") can be updated to the new page URL, and a new record (SN "4") can be added for the "Insurance" element. Notably, the AccessorElement for the new record can be set to refer to the "Benefits" element ("SN 1"). Likewise, new records can be added in response to inputs on the "TimeOff" element (new SN "5") and the "Performance" element (new SN "6").

Referring to server device 520, collection module 522 can receive UI data collected and sent by client devices 502. The UI data may include UI data collected for multiple users and/or multiple sessions. Collection module 522 can store the received UI data in repository 524. In some embodiments, repository 524 can store UI data crowdsourced from many users. The stored UI data 524 may be stored in a tabular format similar to that of TABLE 1. In some embodiments, collection module 522 can renumber the serial numbers (SNs) within UI data received from different client devices 502 such that repository 524 contains unique SNs.

TABLE 2

| SN | App Id | User Id | Session Id | PageURL | PageTitle | ElementId |
|----|---|---|---|---|---|---|
| 1 | HR | 1 | A | https://h.r | Main | Benefits |
| 2 | HR | 1 | A | https://h.r | Main | Time Off |
| 3 | HR | 1 | A | https://h.r | Main | Performance |
| 4 | HR | 1 | A | https://h.r/benefits | Benefits | Insurance |
| 5 | HR | 1 | A | https://h.r/timeoff-123 | Time Off | View PTO |
| 6 | HR | 1 | A | https://h.r/perform-123 | Performance | Start Review |
| 7 | HR | 1 | B | https://h.r | Main | Benefits |
| 8 | HR | 1 | B | https://h.r | Main | Time Off |
| 9 | HR | 1 | B | https://h.r | Main | Performance |
| 10 | HR | 1 | B | https://h.r/timeoff-123 | Time Off | View PTO |
| 11 | HR | 1 | B | https://h.r/perform-456 | Performance | Start Review |
| 12 | HR | 2 | C | https://h.r | Main | Benefits |
| 13 | HR | 2 | C | https://h.r | Main | Time Off |
| 14 | HR | 2 | C | https://h.r | Main | Performance |
| 15 | HR | 2 | C | https://h.r/benefits | Benefits | Insurance |
| 16 | HR | 2 | C | https://h.r/timeoff-456 | Time Off | View PTO |

| SN | Element Attributes | Accessor Type | AccessorElement | TargetURL | AccessorURLType | ScrollPosition |
|----|---|---|---|---|---|---|
| 1 | type=link, . . . | URL | None | https://h.r/benefits | TBD | (0, 0) |
| 2 | type=link, . . . | URL | None | https://h.r/timeoff-123 | TBD | (0, 100) |
| 3 | type=link, . . . | URL | None | https://h.r/perform-123 | TBD | (0, 200) |
| 4 | type=form, . . . | URL | SN 1 | TBD | TBD | (0, 0) |
| 5 | type=section, . . . | URL | SN 2 | TBD | TBD | (0, 0) |
| 6 | type=form, . . . | URL | SN 3 | TBD | TBD | (0, 0) |
| 7 | type=link, . . . | URL | None | TBD | TBD | (0, 0) |
| 8 | type=link, . . . | URL | None | https://h.r/timeoff-123 | TBD | (0, 100) |
| 9 | type=link, . . . | URL | None | https://h.r/perform-456 | TBD | (0, 200) |
| 10 | type=section, . . . | URL | SN 8 | TBD | TBD | (0, 0) |
| 11 | type=form, . . . | URL | SN 9 | TBD | TBD | (0, 0) |
| 12 | type=link, . . . | URL | None | https://h.r/benefits | TBD | (0, 0) |
| 13 | type=link, . . . | URL | None | https://h.r/timeoff-456 | TBD | (0, 100) |
| 14 | type=link, . . . | URL | None | TBD | TBD | (0, 200) |
| 15 | type=form, . . . | URL | SN 12 | TBD | TBD | (0, 0) |
| 16 | type=section, . . . | URL | SN 13 | TBD | TBD | (0, 0) |

TABLE 2 shows an example of UI data that can be stored in repository 524 for multiple users and sessions. The first six records (SNs "1" to "6") are the same as in TABLE 1A. The next five records (SNs "7" to "11") may correspond to UI data collected for the same user (UserId "1") but for a different session (SessionId "B"). Of note, the TargetURL for the "TimeOff" element remains the same between the two session ("https://h.r/timeoff-123") while the TargetURL for the "Performance" element changes between sessions for the same user ("https://h.r/perform-123" versus "https://h.r/perform-456"). The last five records in TABLE 2 (SNs "12" to "16") can correspond to data collected when a second user (UserId "2") visits main page of the HR app (i.e., "https://h.r") and the clicks on both the "Benefits" and "TimeOff" elements.

Data analysis module 526 can analyze and update stored UI data 524 to assist with direct link generation. In some embodiments, analysis module 526 can determine the AccessorURLType value for a given UI element by comparing multiple TargetURL values collected for the UI element. If the TargetURL is the same for different users (e.g., for two or more different users), then module 526 can update the corresponding rows in UI data repository 524 to set AccessorURLType equal to "Static." Otherwise, if TargetURL is the same for a user (i.e., a given UserId) across multiple sessions (i.e., different SessionIds), then module 526 can set AccessorURLType equal to "UserStatic." Otherwise, if TargetURL varies for different users or different sessions of the same user, then module 526 can set AccessorURLType equal to "Dynamic." If there is insufficient UI data to determine one of the above types, then module 526 can set AccessorURLType equal to "TBD" or the like.

TABLE 2A shows an example of how TABLE 2 can be updated to set AccessorURLType based on UI data collected from multiple sessions and users (i.e., based on "crowdsourced" data). In particular, data analysis module 526 can determine that the target of the "Benefits" element is a "Static" URL, the target of the "Time Off" element is a "UserStatic" URL, and the target of the "Performance" element is a "Dynamic" URL.

can be determined that SN12 is a duplicate of SN1 (for which AccessorURLType was determined to be "Static") based on comparing AccessorElement, ElementAttributes, Page Title, URL etc. Similarly, it can be determined that SN8 and SN13 are duplicates of SN2 and thus can be removed.

Feature identification module 528 can identify features of interest using UI data 524 (e.g., crowdsourced data). For example, module 528 can determine which pages, sections, forms, videos, or other types of UI elements are most frequently clicked/viewed/accessed for a given app based on, for example, the corresponding number of records in repository 524. For example, referring to TABLE 2A, module 528 can determine that the "Time Off" page is the most frequently accessed page within the "HR" app based on the number of times that PageTitle appears in the UI data 524. In some embodiments, module 528 can query for certain types of UI elements using ElementAttributes. For example, module 528 can identify the most frequently accessed form, most popular video, etc. In some embodiments, module 528 can identify app features of interest to an individual user, to a group of users, or to all users of the app based on the collected UI data 524. As output, module 528 can generate a list of one or more app features 529 which can be provided as input to link generation module 530.

TABLE 2A

| SN | App Id | User Id | Session Id | PageURL | PageTitle | ElementId |
|---|---|---|---|---|---|---|
| 1 | HR | 1 | A | https://h.r | Main | Benefits |
| 2 | HR | 1 | A | https://h.r | Main | TimeOff |
| 3 | HR | 1 | A | https://h.r | Main | Performance |
| 4 | HR | 1 | A | https://h.r/benefits | Benefits | Insurance |
| 5 | HR | 1 | A | https://h.r/timeoff-123 | Time Off | View PTO |
| 6 | HR | 1 | A | https://h.r/perform-123 | Performance | Start Review |
| 7 | HR | 1 | B | https://h.r | Main | Benefits |
| 8 | HR | 1 | B | https://h.r | Main | TimeOff |
| 9 | HR | 1 | B | https://h.r | Main | Performance |
| 10 | HR | 1 | B | https://h.r/timeoff-123 | Time Off | View PTO |
| 11 | HR | 1 | B | https://h.r/perform-456 | Performance | Start Review |
| 12 | HR | 2 | C | https://h.r | Main | Benefits |
| 13 | HR | 2 | C | https://h.r | Main | TimeOff |
| 14 | HR | 2 | C | https://h.r | Main | Performance |
| 15 | HR | 2 | C | https://h.r/benefits | Benefits | Insurance |
| 16 | HR | 2 | C | https://h.r/timeoff-456 | Time Off | View PTO |

| SN | Element Attributes | Accessor Type | Accessor Element | TargetURL | AccessorURLType | ScrollPosition |
|---|---|---|---|---|---|---|
| 1 | type=link, . . . | URL | None | https://h.r/benefits | Static | (0, 0) |
| 2 | type=link, . . . | URL | None | https://h.r/timeoff-123 | UserStatic | (0, 100) |
| 3 | type=link, . . . | URL | None | https://h.r/perform-123 | Dynamic | (0, 200) |
| 4 | type=form, . . . | URL | SN 1 | TBD | TBD | (0, 0) |
| 5 | type=section, . . . | URL | SN 2 | TBD | TBD | (0, 0) |
| 6 | type=form, . . . | URL | SN 3 | TBD | TBD | (0, 0) |
| 7 | type=link, . . . | URL | None | TBD | TBD | (0, 0) |
| 8 | type=link, . . . | URL | None | https://h.r/timeoff-123 | UserStatic | (0, 100) |
| 9 | type=link, . . . | URL | None | https://h.r/perform-456 | Dynamic | (0, 200) |
| 10 | type=section, . . . | URL | SN 8 | TBD | TBD | (0, 0) |
| 11 | type=form, . . . | URL | SN 9 | TBD | TBD | (0, 0) |
| 12 | type=link, . . . | URL | None | https://h.r/benefits | Static | (0, 0) |
| 13 | type=link, . . . | URL | None | https://h.r/timeoff-456 | UserStatic | (0, 100) |
| 14 | type=link, . . . | URL | None | TBD | TBD | (0, 200) |
| 15 | type=form, . . . | URL | SN 12 | TBD | TBD | (0, 0) |
| 16 | type=section, . . . | URL | SN 13 | TBD | TBD | (0, 0) |

In some embodiments, analysis module 526 can remove duplicate records from the UI data 524. After the AccessorURLType determination is made for a given UI Element, duplicate records can be identified by comparing the record corresponding to that UI element to other records in the collected UI data. For example, referring to TABLE 2A, it While the embodiment of FIG. 5 shows the app features 529 as being identified by server-side module 528, in some embodiments, app features can be identified by a client device 502. For example, a client device 502 may provide a mechanism by which a user can manually indicate a feature of interest. In some embodiments, browser 504 or resource access application 506 can provide a UI toolbox having a button or other control to enable/disable a selection mode. When selection mode is enabled, browser or resource access application 506 may ignore normal inputs on a page's UI elements. Instead, clicking on the page generates a bounding box (e.g., a distinctively colored rectangle) that the user can position around one or more UI elements corresponding to the feature of interest. Once user has selected these UI elements, another toolbox control may be enabled to initiate direct link generation for the selected UI elements (e.g., a "generate direct link" button may be enabled). In response, the client device 502 can communicate with server device 520 to generate a direct link to that feature. At the same time, the selection mode may be disabled, resulting in the removal of the bounding box and restoration of normal user input handling.

Link generation module 530 can generate direct links to app features (e.g., identified features of interest 529) using the stored UI data 524. An illustrative process that can be used to generate direct links is described below in the context of FIG. 8. In some embodiments, a direct link can be implemented as a script that is executable by client devices 502. In some embodiments, a direct link can be implemented using JavaScript.

Generated direct links 531 may be provided, directly or indirectly, to one or more of the client devices 502. For example, as shown in FIG. 5, direct links 531 may be sent directly from server-side module 530 to resource access application 506 and stored in a client-side repository 512. Resource access application 506 can display a list or directory of direct links to the user, allowing users to access various app features with a single input. In other embodiments, direct links may be pushed to one or more client devices 502. In some embodiments, server device 520 can publish direct links to search engine or other repository (not shown) external to server device 520 and client devices 502. In some embodiments, resource access application 506 include a search interface via which users can submit search queries. Here, generated direct links 531 can be provided to the underlying search engine such that search results include direct links to relevant app features.

In some embodiments, a client device 502 may request (or "pull") one or more direct links from server device 520 using an API provided by the server device. In some embodiments, resource access application 506 can, in response to a user input, send a request to server device 520 to generate a direct link to a given app feature. That is, direct links can be generated "on the fly," according to some embodiments.

Referring again to representative client device 502a, link execution module 510 can execute direct links from repository 512. For example, in response to a user input, resource access app 506 can retrieve a direct link from repository 512 and provide the link to module 510 for execution. In some embodiments, link execution module 510 may correspond to a scripting engine (e.g., a JavaScript engine) provided by web browser 504. In some embodiments, link execution module 510 may be provided as a part of resource access app 506.

While described embodiments rely on both a client device 502 and a server device 520 to provide direct linking functionality, in other embodiments, such functionality can be implemented entirely within the client device 502. For example, UI data collection module 522, UI data 524, data analysis module 526, feature identification module 528, and/or link generation module 530 can be implemented or otherwise provided within a client device 502.

Figure 6:
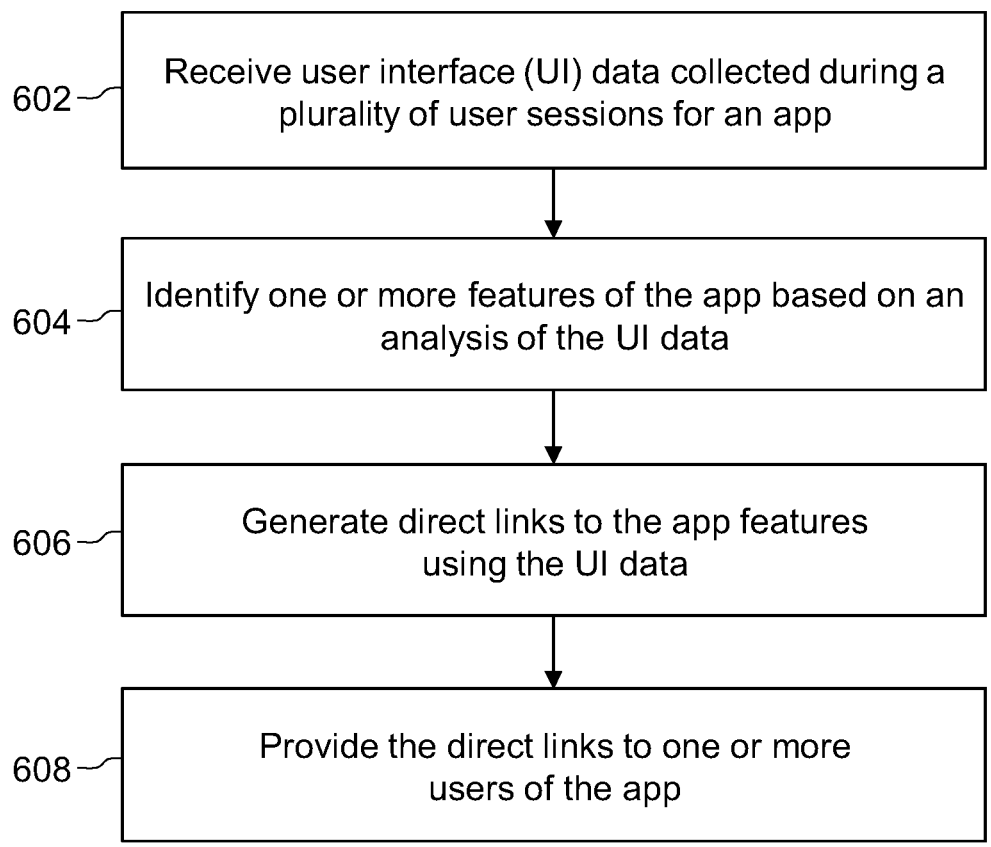
FIG. 6 is a flow diagram showing a process for identifying app features and generating direct links thereto, according to some embodiments.
Figure 7:
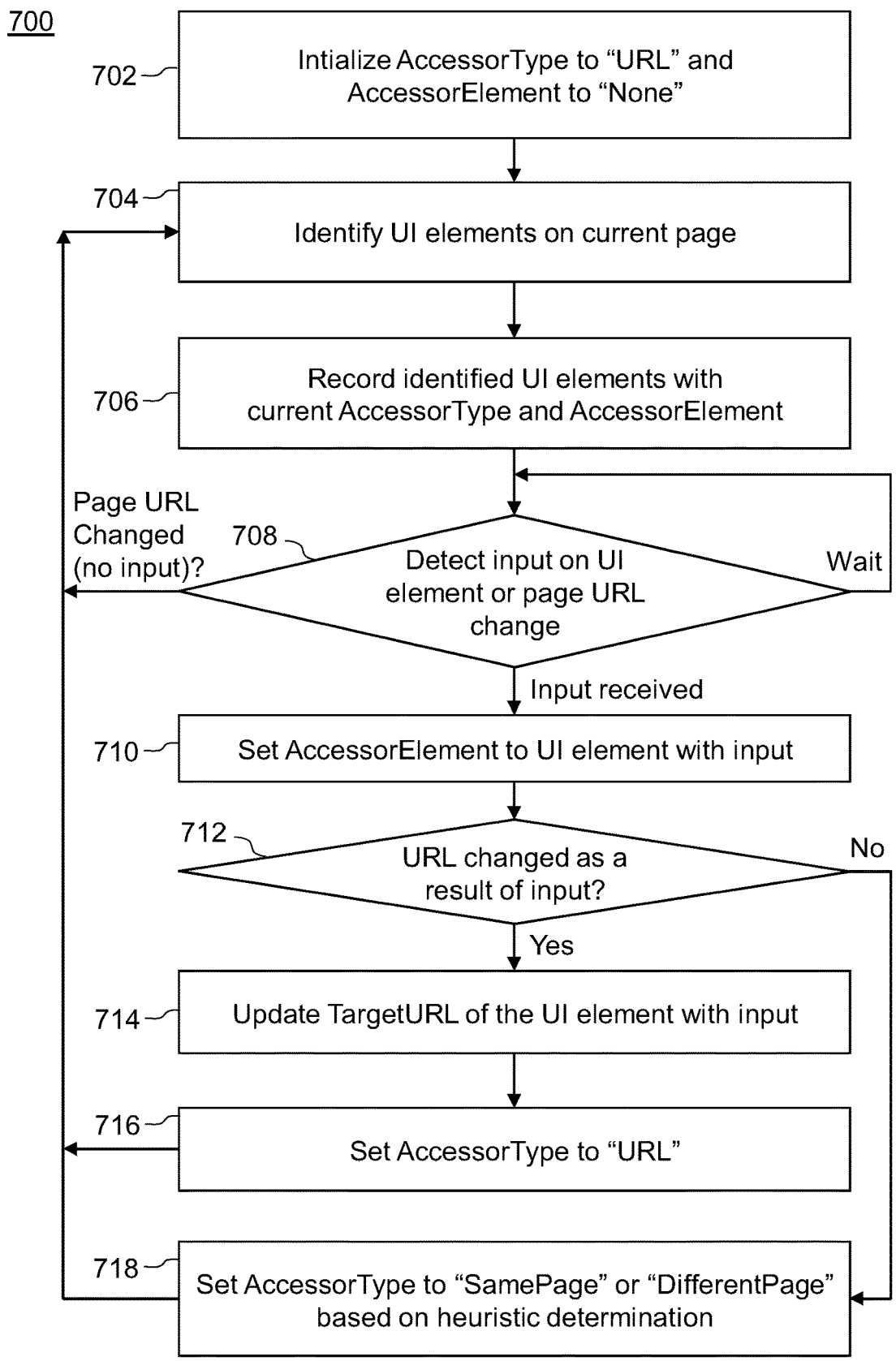
FIG. 7 is a flow diagram showing a process for collecting user interface (UI) data that can be used to generate direct links to app features, according to some embodiments.
Figure 8:
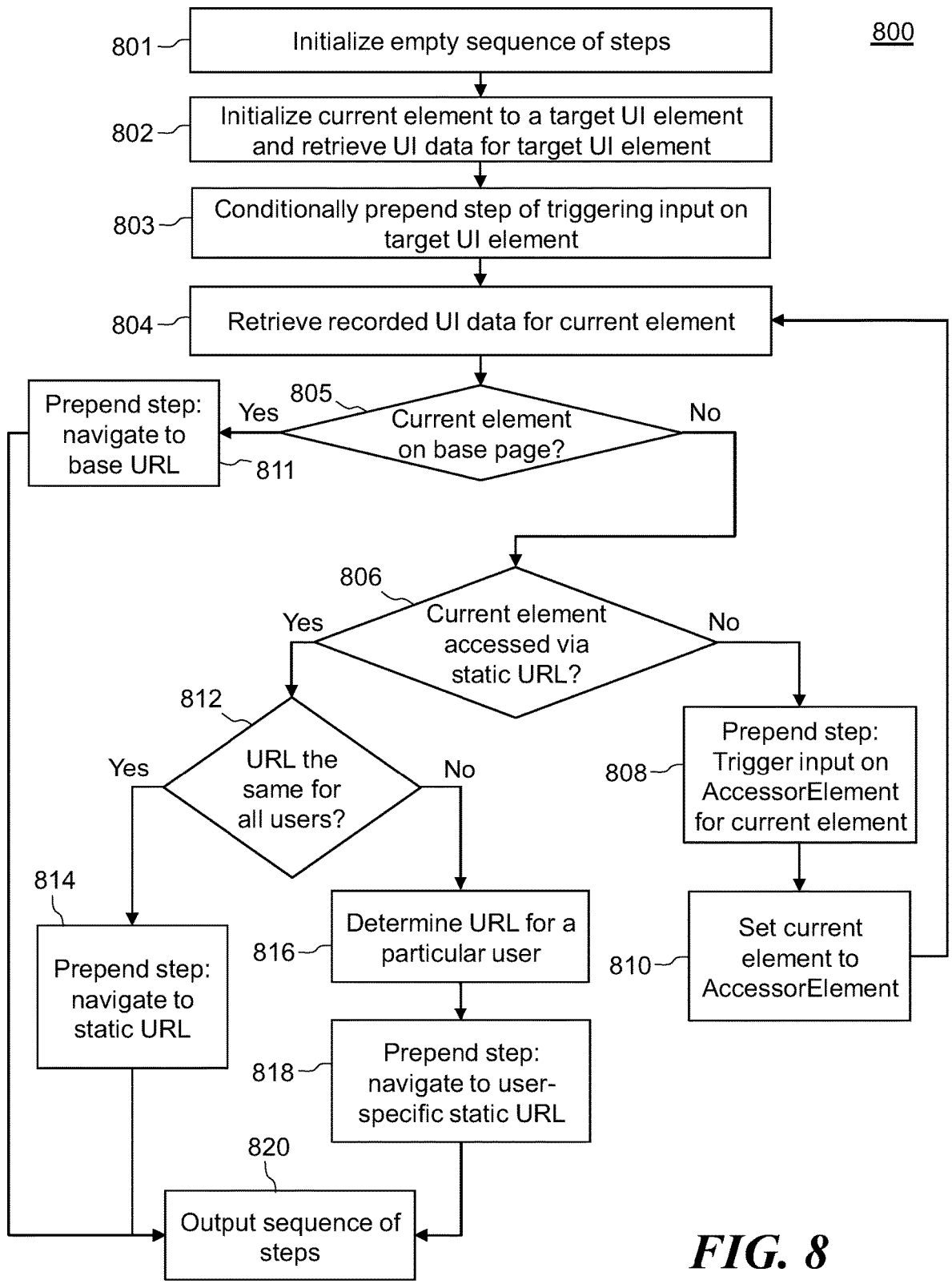
FIG. 8 is a flow diagram showing a process for generating a direct links to app features, according to some embodiments.

FIGS. 6, 7, and 8 are flow diagrams showing illustrative processing that can be implemented within, for example, the system 500 of FIG. 5. Rectangular elements, herein denoted "processing blocks," represent computer software instructions or groups of instructions and diamond shapes elements, herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

FIG. 6 shows a process 600 for identifying app features and generating direct links thereto, according to some embodiments. The illustrative process 600 can be implemented within a server device (e.g., server device 520 of FIG. 5) or within a client device (e.g., representative client device 502a of FIG. 5).

At block 602, UI data may be received from one or more client devices. The UI data may include data collected by the one or more client devices during a plurality of user sessions for an app. The plurality of user sessions may include sessions for a single user or sessions for multiple different users.

At block 604, the UI data can be analyzed to identify one or more features of the app. Techniques that can be used to identify app features are described above in the context of feature identification module 528 of FIG. 5. In some embodiments, a user can manually identify features of interest (e.g., by providing an input on corresponding UI elements within the app).

At block 606, direct links can be generated for one or more of the identified app features. An illustrative process for generating direct links is described below in the context of FIG. 8.

At block 608, the generated links can be provided to one or more users of the app. In some embodiments, this can include sending the direct links to a resource access application installed on client devices. In some embodiments, direct links can be published to a search engine, or other repository, accessible by the resource access application. When the user clicks on a direct link, the direct link can interact with the one or more UI elements to navigate to the corresponding app feature. In some embodiments, this can include executing a sequence of steps (e.g., a sequence of JavaScript instructions) to navigate to the application feature. In some embodiments, a direct link may navigate to the app feature without display of other portions of the application that do not include the feature. For example, the direct link steps can include hiding/removing UI elements on the page that are not part of the feature.

FIG. 7 shows a process 700 for collecting user interface (UI) data that can be used to generate direct links to app features, according to some embodiments. The illustrative process 700 can be implemented within a server device or a client device.

Process 700 can begin at block 702 by initializing AccessorType to "URL" and AccessorElement to "None." At block 704, one or more UI elements can be identified on the current page. In some examples, event listeners can be attached to the identified UI elements to detect if a user clicks/taps or otherwise provides an input on the identified UI elements. The event listeners can include "click" or "tap" event listeners. In some embodiments, an event listener can be configured to listen for browser navigation events to detect when the current page URL changes.

At block 706, the UI element can be recorded with the current AccessorType and AccessorElement values. In some embodiments, block 706 can be done by adding entries to a table of UI data, such as TABLE 1 shown and described above. That is, along with the current values of AccessorType and AccessorElement, one or more of following values can be recorded for each UI element: AppId, UserId, SessionId, PageURL, PageTitle, ElementId, ElementAttributes, and ScrollPosition.

At block 708, inputs or a page URL change can be detected. In some examples, event listeners can be used to detect a user input on one of the UI elements or for the current page URL to change. If the current page URL changed but no user input was received (i.e., the URL change was not caused by a user interaction on one of the identified UI elements), then process 700 can repeat from blocks 704 and 706 by identifying and recording UI elements on the new page. Otherwise, if a user input was received, process 700 can proceed to block 710.

At block 710, AccessorElement is set to the UI element on which the user input was received. In some embodiments, AccessorElement can be set to the serial number of the UI element as defined in table of UI data. In other embodiments, AccessorElement can be set to include attributes of the UI Element along with its the page URL, title, or other identifying information for the UI element within the app. At block 712, if the current page URL changed as a result of the user input, then (block 714) the previously recorded UI data for the UI element can updated to set TargetURL to the new page URL. In addition, at block 716, AccessorType can be set to "URL." If the current page URL did not change as a result of the user input, then AccessorType can be set to "DifferentPage."

Process 700 can repeat from can repeat from block 704, as shown. Notably, the AccessorElement value set at block 710 and the AccessorType value set at block 716 or 718 are carried forward and used in the next occurrence of block 706.

FIG. 8 shows a process 800 for generating a direct link to an app feature of interest, according to some embodiments. The illustrative process 800 can be implemented within a server device or a client device. The process 800 can utilize UI data collected, for example, using process 700 of FIG. 7. In some embodiments, the UI data can include data from multiple users and/or sessions. In some embodiments, the UI data can be analyzed to determine AccessorURLType as described above in conjunction with data analysis module 526 of FIG. 5. Such analysis can be performed prior to process 800 or as part of process 800.

A direct link generated by process 800 can include a script having a sequence of steps executable by a client device to navigate the user to the feature of interest. At block 801, an empty sequence of steps can be initialized.

At block 802, a current element can be initialized to a target UI element of the app feature of interest. For example, the target UI element can be a page, section, form, video, etc. In addition, UI data recorded for the target UI element can be retrieved (e.g., from repository 524 of FIG. 5). The retrieved UI data can include one or more of the following previously described values: SN, AppId, UserId, SessionId, PageURL, PageTitle, ElementId, ElementAttributes, AccessorType, AccessorElement, TargetURL, AccessorURLType, and ScrollPosition.

At block 803, if the AccessorURLType for the target UI element is "Dynamic" or unknown, then at block 803 a step can be prepended to the sequence to trigger an input on the target UI element. In some embodiments, the prepended step can invoke a JavaScript statement to dispatch a DOM event (e.g., a "click" or "scroll" event) on the DOM element corresponding to the UI element. If the AccessorURLType is "Static" or "UserStatic," then no such step may be prepended.

At block 804, UI data recorded for the current element can be retrieved if necessary. During the initial iteration of process 800, the current element is set to the target UI element and, thus, the corresponding UI data would have already been retrieved at block 802.

At block 805, a determination can be made as to whether the current element is on the app's base page, for example by checking if the element's PageURL is equal to the app's base URL. If the current element is on the base page, then a step of navigating to the base URL can be appended to the sequence of steps at block 811 and the process can proceed to block 820 described below. In some embodiments, the step of navigating to a URL can include a JavaScript statement to change the current window location to the URL.

If the current element is not on the app's base, then at block 806, a determination can be made as to whether the current element can be accessed via a static URL. In some embodiments, this determination can be made if AccessorURLType equals "Static" or "UserStatic."

If the current element cannot be accessed via a static URL, then at block 808, a step can be prepended to the sequence to trigger an input on the AccessorElement defined for the current element. In some embodiments, the prepended step can invoke a JavaScript statement to dispatch a DOM event (e.g., a "click" event) on the DOM element corresponding to the defined AccessorElement. To identify the DOM element in script, a DOM selector/query can be generated using the UI data recorded for the AccessorElement (e.g., using the ElementId and/or ElementAttributes values discussed above). In some embodiments, the selector can be a jQuery selector. In some embodiments, an intermediate step can be prepended to wait for the AccessorElement to load or otherwise become available before trigger the input. At block 810, the current element can then be set to the AccessorElement and the process can repeat from block 804, as shown.

At block 812, if the URL to access the current element is the same for all users (e.g., AccessorURLType equals "Static"), then a block 814, a step can be prepended to the sequence to navigate to the static URL and the process can terminate by outputting the sequence of steps (block 820). In this case, the direct link produced by process 800 may be operable for all users of the app. If, at block 812, the URL to access the current element is not the same for all users (e.g., AccessorURLType equals "UserStatic"), then process 800 can determine the user-specific static URL for a given user (block 816) and prepend a step of navigating thereto (block 818). In this case, the direct link produced by process

800 may be operable only for that particular user (however the process can simply be repeated to provide direct links for other users, or even all users of the app).

In some embodiments, process 800 can add steps to the sequence to cause the browser to scroll down to the app feature as needed. For example, depending on the value of ScrollPosition defined for the target UI element, process 800 can append a final step of adjusting the browser window's vertical and/or horizontal scroll position (e.g., using the JavaScript "scrollTo" function).

To further illustrate process 800, assume a direct link is to be generated to the "Start Review" feature of the "HR" app described above. At block 802, the current element is initialized to the "Start Review" element. As shown in TABLE 2A, the AccessorURLType for this element is unknown ("TBD"). Thus, at block 803, a step to click on the "Start Review" element is prepended to the sequence of steps. In additional, because the AccessorURLType is unknown, processing proceeds to block 808 and a step to click the "Performance" element (i.e., the AccessorElement for "Start Review") is prepended to the sequence of steps. The process proceeds to retrieve the "Performance" element as the current element as blocks 810 and 804. Because the "Performance" element is on base page for the app, then at block 811, the step of navigating to the base URL ("https://h.r") can be prepended. The final direct link output by process 800 can include the following sequence:

1. Navigate to "https://h.r"
2. Click "Performance"
3. Click "Start Review"

This multi-step sequence can be automatically executed by a client device in response to a single user input.

As another example, assume a direct link is to be generated to the "Benefits" page of the "HR" app described above. Using a crowdsourced analysis of collected UI data according to the present disclosure, it can be determined that the URL to this page is static ("SameForAllUsers") as shown in TABLE 2A. Thus, process 800 can proceed to block 814 by prepending the static URL to the "Benefits" page and generate an optimized direct link having a single step:

1. Navigate to "https://h.r/benefits"

It is appreciated herein that process 800 is a backtracking process capable of generating direct links to app features that have a minimum number of steps by favoring direct URL navigation when possible, while using simulated user inputs as needed to account for dynamic URLs and for single-page applications.

The following examples pertain to further embodiments, from which numerous permutations and configurations will be apparent.

Example 1 includes a method including: receiving, by a computing device, information indicative of user interface (UI) elements of an application and inputs received by the UI elements; identifying, by the computing device, a feature of the application based on the received information; generating, by the computing device, a direct link to the feature by determining, from the received information, one or more of the UI elements that received inputs to navigate to the feature; and providing, by the computing device, the direct link to one or more users of the application, wherein in response to an input received on the direct link, the direct link interacts with the one or more UI elements to navigate to the application feature.

Example 2 includes the subject matter of Example 1, wherein the generation of the direct link comprises generating a script having a sequence of steps for interacting with the one or more UI elements, wherein in response to the input received on the direct link, the sequence of steps are executed to navigate to the application feature.

Example 3 includes the subject matter of Example 2, wherein the sequence of steps includes a first step of navigating to a static URL and a last step of triggering an input on one of the UI elements.

Example 4 includes the subject matter of Examples 1 to 3, and further includes analyzing the received information to determine that a first one of the UI elements can be accessed using a static URL and a second one of the UI elements cannot be accessed using a static URL.

Example 5 includes the subject matter of Examples 1 to 4, wherein the received information is indicative of inputs used to access the UI elements by a plurality of users during a plurality of user sessions, and further includes analyzing the received information to determine that a first one of the UI elements can be accessed using a URL that is the same for the same user across different user sessions and different for different users.

Example 6 includes the subject matter of Examples 1 to 5, wherein the received information indicates that ones of the UI elements can be accessed via an input on others of the UI elements.

Example 7 includes the subject matter of Examples 1 to 6, wherein the identification of the feature comprises determining a frequency at which one or more of the UI elements are accessed.

Example 8 includes the subject matter of Examples 1 to 6, wherein the identification of the feature comprises receiving an input on one or more UI elements associated with the feature.

Example 9 includes the subject matter of Examples 1 to 8, wherein the providing of the direct link to the one or more users of the application includes sending the direct link to client devices configured to display the direct link within a directory of direct links accessible to the one or more users.

Example 10 includes the subject matter of Examples 1 to 8, wherein the providing of the direct link to the one or more users of the application includes publishing the direct link to a search engine accessible by client devices configured to run the application.

Example 11 includes the subject matter of Examples 1 to 10, wherein in response to the input received on the direct link, the direct link interacts with the one or more UI elements to navigate to the application feature without display of other portions of the application that do not include the feature task to the second client device.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method comprising:
   receiving, by a computing device, information indicative of user interface (UI) elements of an application and inputs received by the UI elements;
   identifying, by the computing device, a feature of the application based on the received information;
   generating, by the computing device, a direct link to the feature by determining, from the received information, one or more of the UI elements that received inputs to navigate to the feature; and
   providing, by the computing device, the direct link to one or more users of the application, wherein in response to an input received on the direct link, the direct link interacts with the one or more UI elements to navigate to the application feature.

2. The method of claim 1, wherein the generation of the direct link comprises generating a script having a sequence of steps for interacting with the one or more UI elements, wherein in response to the input received on the direct link, the sequence of steps are executed to navigate to the application feature.

3. The method of claim 2, wherein the sequence of steps includes a first step of navigating to a static URL and a last step of triggering an input on one of the UI elements.

4. The method of claim 1, comprising:
   analyzing the received information to determine that a first one of the UI elements can be accessed using a static URL and a second one of the UI elements cannot be accessed using a static URL.

5. The method of claim 1, wherein the received information is indicative of inputs used to access the UI elements by a plurality of users during a plurality of user sessions, the method comprising:
   analyzing the received information to determine that a first one of the UI elements can be accessed using a URL that is the same for the same user across different user sessions and different for different users.

6. The method of claim 1, wherein the received information indicates that ones of the UI elements can be accessed via an input on others of the UI elements.

7. The method of claim 1, wherein the identification of the feature comprises determining a frequency at which one or more of the UI elements are accessed.

8. The method of claim 1, wherein the identification of the feature comprises receiving an input on one or more UI elements associated with the feature.

9. The method of claim 1, wherein the providing of the direct link to the one or more users of the application comprises:
   sending the direct link to client devices configured to display the direct link within a directory of direct links accessible to the one or more users.

10. The method of claim 1, wherein the providing of the direct link to the one or more users of the application comprises:
    publishing the direct link to a search engine accessible by client devices configured to run the application.

11. The method of claim 1, wherein in response to the input received on the direct link, the direct link interacts with the one or more UI elements to navigate to the application feature without display of other portions of the application that do not include the feature.

12. A device comprising:
    a processor; and
    a non-volatile memory storing computer program code that when executed on the processor causes the processor to execute a process operable to:

receive information indicative of user interface (UI) elements of an application and inputs received by the UI elements;

identify a feature of the application based on the received information;

generate a direct link to the feature by determining, from the received information, one or more of the UI elements that received inputs to navigate to the feature; and provide the direct link to one or more users of the application, wherein in response to an input received on the direct link, the direct link interacts with the one or more UI elements to navigate to the application feature.

13. The device of claim 12, wherein the generation of the direct link comprises generating a script having a sequence of steps for interacting with the one or more UI elements.

14. The device of claim 13, wherein the sequence of steps includes a first step of navigating to a static URL and a last step of triggering an input on one of the UI elements.

15. The device of claim 12, wherein the computer program code when executed on the processor causes the processor to execute the process further operable to:

analyze the received information to determine that a first one of the UI elements can be accessed using a static URL and a second one of the UI elements cannot be accessed using a static URL.

16. The device of claim 12, wherein the received information is indicative of inputs used to access the UI elements by a plurality of users during a plurality of user sessions, wherein the computer program code when executed on the processor causes the processor to execute the process further operable to:

analyze the received information to determine that a first one of the UI elements can be accessed using a URL that is the same for the same user across different user sessions and different for different users.

17. The device of claim 12, wherein the received information indicates that a first one of the UI elements can be accessed via an input on a second one of the UI elements.

18. The device of claim 12, wherein the identification of the feature comprises determining a frequency at which one or more of the UI elements are accessed.

19. The device of claim 12, wherein the providing of the direct link to the one or more users of the application comprises:

sending the direct link to client devices configured to display the direct link within a directory of direct links accessible to the one or more users.

20. A non-transitory computer-readable medium storing program instructions that are executable to:

receive, by a computing device, information indicative of user interface (UI) elements of an application and inputs received by the UI elements;

identify, by the computing device, a feature of the application based on the received information;

generate, by the computing device, a direct link to the feature by determining, from the received information, one or more of the UI elements that received inputs to navigate to the feature; and provide, by the computing device, the direct link to one or more users of the application, wherein in response to an input received on the direct link, the direct link interacts with the one or more UI elements to navigate to the application feature.

* * * * *